3,305,266
SEAT BELT TERMINAL JACKET
Arthur S. Nicholas, 1526 Groton Road SE., Grand Rapids, Mich. 49506, and Donald L. Fuerst, 901 Reynard SE., Grand Rapids, Mich. 49507
Filed Oct. 21, 1965, Ser. No. 499,726
5 Claims. (Cl. 297—385)

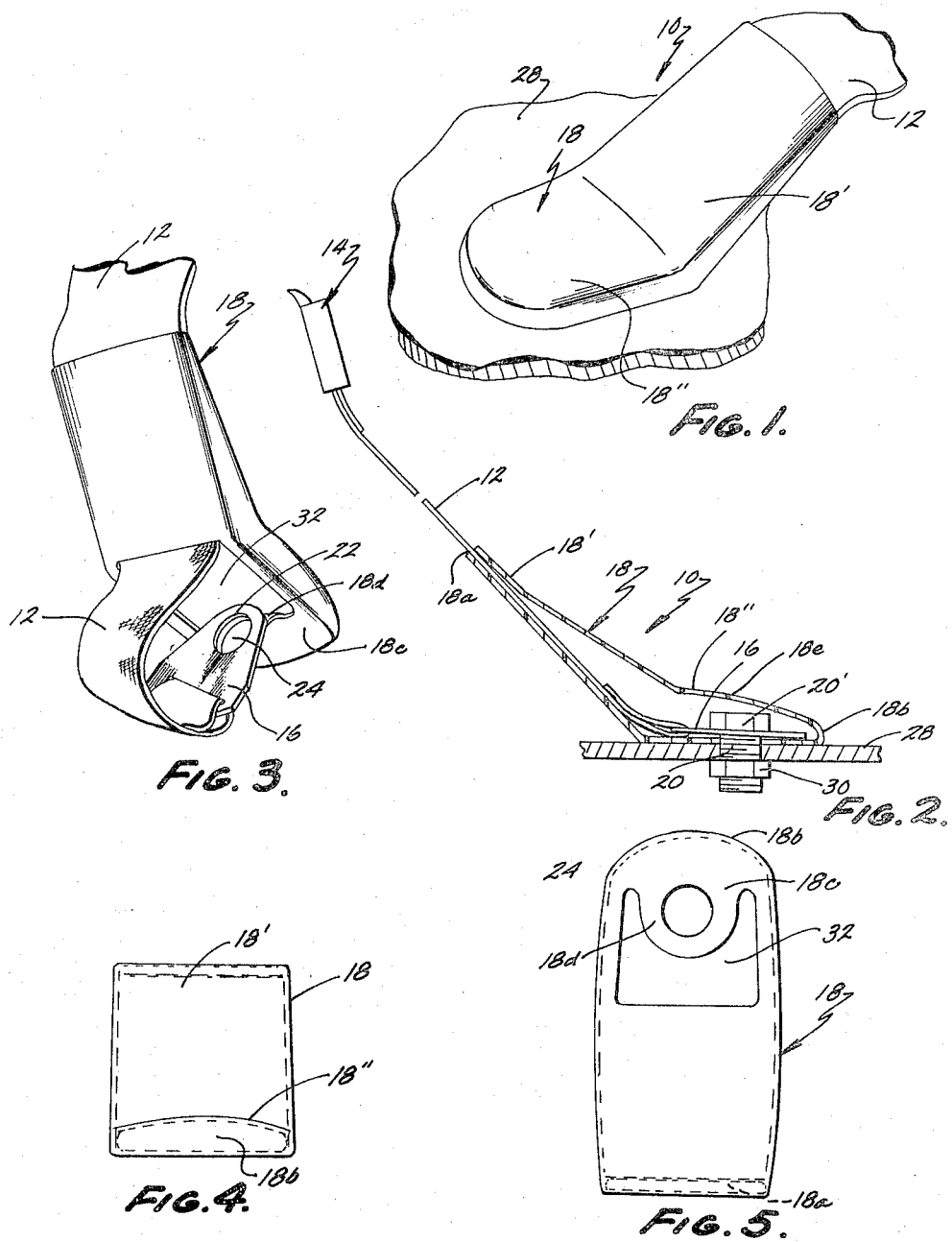

This invention relates to safety belt equipment for vehicles, and more particularly to an improved type protector jacket for the lower secured terminal portion of a safety belt and its anchor, and to the complete anchor element, belt, and jacket assembly.

Protective jackets for the lower anchored terminal portion of vehicular safety belt assemblies have heretofore been largely one of two types; (1) those which comprise a sleeve open on both ends, and slid down over the belt and around a portion of the anchor assembly, and (2) those which extend around a terminal belt portion and have an end securely anchored by the fastener that anchors the belt anchor plate. Primarily, the first type is employed with a so-called "sister hook" assembly, while the second type is employed with an anchor plate assembly.

This first type does effectively cover the anchor assembly to prevent shoe-scuffing, when it is in position, but it is completely dependent upon frictional relationship to the belt and anchor means to be retained. It can readily slide up the belt off the anchor assembly to expose the anchor assembly for scuffing shoes and to allow penetration by mud, dirt, moisture, snow, etc. The second type always remains in its proper position since it is definitely and positively anchored, but it still allows limited exposure of the anchor assembly to some dirt, moisture, mud, snow, etc. through the opening formed in the top of the protector jacket for allowing access to the stud fastener for connection and disconnection. This opening in the top of the jacket is provided to allow the stud fastener to be initially inserted through the anchor plate in the jacket and through the bottom of the jacket for attachment to the vehicular floor or other rigid support in the vehicle.

It would be extremely advantageous of course to have a protective jacket and anchoring assembly that enables this jacket to be securely and directly anchored by a stud fastener, as with the second type above, but which would also completely enclose the anchor assembly, including the top of the plate and stud fastener, for complete protection of the terminal belt portion and anchor assembly from moisture, dust, snow, mud, etc.

It is an object of this invention to provide such a safety belt terminal portion protector jacket that achieves all of these desirable results, i.e. completely encloses the terminal belt portion, anchor plate, and fastener from moisture, dust, etc. on the top as well as on the end and side edges of the anchor assembly, yet employs a headed fastener such as a stud, and positively secures the jacket with the fastener as well as the anchor plate.

Another object of this invention is to provide a novel safety belt terminal portion jacket that can itself be directly secured by a headed fastener, yet completely encloses the head of the headed type fastener as well as enclosing an anchor plate and seat belt terminal portion.

Another object of this invention is to provide a safety belt jacket and jacket assembly that enables quick simple assembly thereof and attachment to the vehicular support surface with a stud type fastener to secure all of the elements, with the jacket completely enclosing and protecting all of the elements of the assembly.

These and other objects of this invention will become apparent upon studying the following specification in conjunction with the drawings in which:

FIG. 1 is a perspective top view of the terminal belt portion and protective jacket assembly shown mounted to a vehicular support element;

FIG. 2 is a side elevational, partially sectioned view of the belt and protector assembly shown in FIG. 1;

FIG. 3 is a perspective view of the belt, anchor plate, and jacket in its temporarily deformed relationship to allow insertion of a headed fastener means such as a stud;

FIG. 4 is a front end elevational view of the jacket; and

FIG. 5 is a bottom view of the jacket.

Referring now specifically to the drawings, the complete assembly 10 shown in FIGS. 1 and 2 includes a seat belt 12 having on its free end a connector means such as a buckle 14, or alternatively a keeper plate, or any other equivalent connector means. It is secured to the connector in conventional fashion by a doubled back belt loop stitched to itself. The second end of the belt is attached to an anchor plate 16 by extending the belt through an opening in the anchor plate, doubling the belt back, and stitching the segments together.

The anchor plate and adjacent end portion of the belt are enveloped and enclosed by the novel jacket 18, as is the head 20' of the threaded stud fastener 20. The stud shank extends down through orifice 22 in anchor plate 16, and through orifice 24 in the bottom of protector jacket 18. It extends from the jacket through an orifice in the rigid vehicular support element 28, for example the vehicle floor board, for securement as by a nut 30.

Jacket 18 is preferably of a polymeric type material. It has semi-rigidity but difinite flexibility and resiliency so that it is generally self-supporting but temporarily deformable in the manners noted hereinafter. It includes a first sleeve portion 18' receiving the terminal end portion of the belt webbing, and a second sleeve portion 18", preferably at an obtuse angle to the first portion, and receiving and enclosing the anchor plate 16 as well as the head 20' of the headed fastener 20. The cross section of this jacket is generally oblong and flattened, to include two edges, two generally wide side faces and two ends. First portion 18' has an open end 18a and throat that fits snugly around the belt webbing to close off any access to its interior. It has side faces diverging at a small angle from open end 18a to form a passageway or chamber capable of receiving the doubled back lower belt end. The passageway extends directly into the chamber portion within the second jacket portion 18".

This second portion 18" has its opposite end 18b integrally closed to extend around the terminal end of generally flat anchor plate 16. The interior of portion 18" has a height sufficient to readily accommodate and enclose anchor plate 16 and stud head 20'. As the jacket is normally employed, the one flat face of its oblong configuration is oriented generally upwardly, and the other is oriented generally downwardly. The lower face of portion 18" is preferably flat to fit tightly and sealingly against the correspondingly flat support 28. The obtuse angular relationship is preferred since it enables the belt to project upwardly for convenient usage with respect to a vehicle seat, when the assembly is mounted to the vehicle floor. The particular angle, shown to be an obtuse angle, may be varied to suit the seat structure of particular vehicles or to suit the orientation of mounting surface 28 whether it be horizontal or otherwise.

Basically, therefore, the jacket is a hollow, elongated member having both narrow side edges completely closed, one throated end open and closely fitted around the extended part of the belt webbing, the other lower end completely closed, its upper wide face completely closed, and with special openings in the under surface of portion 18" to allow stud insertion and fastening. This under surface has a particular construction that enables the upper surface to be completely closed.

Specifically, in wide generally flat under face 18c is provided a wide opening 32 adjacent closed end 18b, and beneath anchor plate 16. Opening 32 has a width substantially equal to the width of opening 18a in the opposite end of the jacket, i.e. about the same as the belt width and the anchor plate width, to allow temporary protrusion of a portion of anchor plate 16, and the terminal doubled end portion of belt webbing 12 in the manner illustrated in FIG. 3. Projecting generally from end 18b into this opening 32 is an integral flap 18d which contains orifice 24. This flap normally lies in the plane of the under surface 18c, but is flexibly bendable to a position generally perpendicular to its normal orientation to allow belt and plate extension and insertion of headed fastener 20, even though no opening is provided in the upper surface 18e of portion 18″. This flexible flap has a resilience which normally allows its convenient return to its relationship in the plane of under surface 18c when it is completely attached as shown in FIG. 2.

The assembly operation of these components may be completely, relatively, quickly, and easily achieved in the following manner. Anchor plate 16 and the attached webbing are inserted downwardly through opening 18a into the jacket until orifice 22 is aligned with orifice 24, with plate 16 in portion 18″ of the jacket. The plate 16 is made with a width about equal to that of the webbing and opening 18a to permit this insertion. The lower terminal end of webbing 12 is then withdrawn out opening 32 in a loop in the manner shown in FIG. 3, as by extending a finger into opening 32 around webbing 12 and pulling it while holding plate 16 and flap 18d together. This causes flexing of flap 18d to its extended position out of its normal plane, enabling a fastener such as threaded stud fastener 20 to be inserted from inside the loop, down through orifices 22 and 24. The opposite end of belt 12 is then pulled to return the anchor plate and the lower end of belt 12 back into the jacket to be entirely within its confines. Then the extended threaded portion of fastener 20 can be inserted down through the opening in support 28 for attachment of a nut 30 or the equivalent. If desired small dimples can project from the upper surface of plate 16 to prevent any tendency of the stud to rotate. When attached, the fastener secures the anchor plate, safety belt, and protective jacket 18 in anchored condition. Preferably the jacket has a pair of inwardly projecting side flanges astraddle opening 32, and anchor plate 16 has side edges that will extend slightly over these flanges when contained in the jacket. Since the flanges are somewhat flexible, the plate can be shifted past them to the FIG. 3 position and back, but when mounted as in FIG. 2, the plate helps seal the bottom opening tightly against support 28 to prevent access of moisture, dirt, etc. Thus, the only opening means in the anchor plate end of the jacket is now completely covered by surface 28 and sealed around its periphery by tightening of anchor plate 16 down against the peripheral flange portion that surrounds opening 32. Since opening 18a is formed to provide a snug fit around the belt webbing, entry of foreign materials into the jacket is practically nonexistent. Therefore, this novel device, even though simple in nature, achieves in one unit all of the collective advantages of the prior units.

Additional advantages not specifically recited may also be noted by those having ordinary skill in this field. It is also conceivable that the structure may be modified in its details without departing from the concept presented. Therefore, the invention is intended to be limited only by the scope of the appended claims and the reasonable equivalents to those defined therein.

We claim:

1. A safety belt terminal protector comprising: an elongated unitary hollow jacket having a first belt receiving portion, and a second anchor element receiving portion integral therewith, both said portions being oblong in cross section to have narrow edges and relatively wide side faces; said first portion being peripherally closed, having a first open end for protrusion of a safety belt out of said jacket, and a passage into said second portion; said second portion having its terminal end closed, both edges closed, one side completely closed, and having an opening on the opposite side, said opening having a width substantially equal to the width of said open end to allow a section of belt and an attached orificed anchor member on the belt to be protruded temporarily therefrom; said second portion having an integral flap extending part way across said opening from the end of said opening closest to the terminal end of said second portion; said flap having an orifice therethrough to receive a fastener, and said flap being resiliently flexible to bend to an extended position generally normal to its regular position for allowing a belt and its anchor member to be extended through said opening for extension of a fastener through the anchor member and said flap.

2. A safety belt and anchor plate terminal protector comprising: a water repellent, dust repellent jacket having a generally flattened cross section with two closed edges and two wide sides, to receive and closely encompass a safety belt portion and an attached orificed anchor plate; said sleeve having one end open for belt extension therefrom, and the other end closed to extend around the end of an anchor plate; one of said sides being closed, and the other side having an opening adjacent said closed end, and having a flexible orificed anchor flap extending into said opening; said opening having a width substantially equal to but slightly less than the sleeve width to allow temporary protrusion of a belt segment and an anchor plate therethrough with flexing of said flap to a protruding position, for insertion of a fastener through an anchor plate and said orificed flap.

3. A safety belt and protector jacket assembly comprising: a safety belt having a connector on one end and an orificed anchor plate on the other; an elongated protector jacket encompassing said plate and an adjacent portion of said belt; said jacket having an oblong, generally flattened cross section with two ends, two edges, and two wide faces, one end having an opening snugly fitting around said belt, and the other end closed and extending around the terminal end of the said anchor plate; said jacket having an opening in one face adjacent said closed end, with the opposite face being completely closed for covering and concealment of the components in said jacket; said jacket also having a flexible integral, orificed, attachment flap extending into said opening and normally in the plane of said one face; a headed fastener extending through the orifices in said flap and said anchor plate and extending from said one face of said jacket for attachment to a support, and having its head between said anchor plate and said closed opposite face; said flap being flexible for temporary protrusion from said jacket out of its normal plane, and said opening having a width to allow temporary protrusion of a segment of said anchor plate and doubled segment of said belt therethrough for insertion of said headed fastener.

4. The assembly in claim 3 wherein said jacket includes a pair of flexible side flanges straddling said opening, flexibly shiftable to allow said temporary extension of said anchor plate, and extending over the edges of said anchor plate when the latter is contained, to enable said anchor plate to close said opening against a support surface when secured.

5. In combination: an orificed vehicular support element having a mounting surface; a safety belt having a connector on one end and an orificed anchor plate on the other; an elongated protector jacket encompassing said plate and an adjacent portion of said belt; said jacket having an oblong, generally flattened cross section with two ends, two edges, and two wide faces, one end having an opening snugly fitting around said belt, and the other end closed and extending around the terminal end of the said anchor plate; said jacket having an opening in one face adjacent said closed end, with the opposite face being completely closed for covering and concealment of the components in said jacket; said jacket also having a flexible integral, orificed, attachment flap extending into said opening and normally in the plane of said one face; a headed fastener extending through the orifices in said flap and said anchor plate and extending from said one face of said jacket for attachment to a support, and having its head between said anchor plate and said closed opposite face; said flap being flexible for temporary protrusion from said jacket out of its normal plane, and said opening having a width to allow temporary protrusion of a segment of said anchor plate and doubled segment of said belt therethrough for insertion of said headed fastener; said fastener extending through said orificed support element with said one face against said mounting surface; said jacket including a pair of flexible side flanges straddling said opening, flexibly shiftable to allow said temporary extension of said anchor plate, and extending over the edges of said anchor plate when the latter is contained, to enable said anchor plate to close said opening against said mounting surface.

References Cited by the Examiner
UNITED STATES PATENTS

| | | | |
|---|---|---|---|
| 2,203,030 | 6/1940 | Pehrson | 16—125 |
| 2,046,056 | 7/1962 | Greene et al. | 291—385 |
| 3,126,228 | 3/1962 | Greene et al. | 297—385 |
| 3,171,688 | 3/1965 | Nicholas | 297—388 |
| 3,175,862 | 3/1965 | Robbins | 297—385 |

FOREIGN PATENTS 628,438   8/1949   Great Britain.

FRANK B. SHERRY, *Primary Examiner.*

JAMES T. McCALL, *Assistant Examiner.*